HEAT IN MOLTEN SALT

WASH OFF SALT IN HOT WATER

COOL IN WATER (UP TO CUFF)

SLOW DIP IN PLASTISOL

INVENTOR
NEIL E. TILLOTSON
ATTORNEY though of the fact that the forms of the invention herein shown and described are to be taken as preferred examples of the same, and that various changes in the shape, size and arrangement of parts may be resorted to, without departing from the spirit of the invention or scope of the subjoined claims.

United States Patent Office 3,487,146
Patented Dec. 30, 1969

3,487,146
PROCESS FOR DIP MOLDING ARTICLES HAVING PORTIONS OF INCREASED THICKNESS
Neil E. Tillotson, Needham Heights, Mass., assignor to Tillotson Corporation, Needham Heights, Mass., a corporation of Massachusetts
Filed Mar. 14, 1966, Ser. No. 533,940
Int. Cl. B29c 13/00; B29d 31/00; A61b 19/04
U.S. Cl. 264—303      1 Claim This invention relates to the manufacture of dip-molded plastic surgical gloves, in which a heated mold is immersed into a heat hardenable plastic-forming liquid. In particular the invention is aimed at providing an area of increased thickness in the cuff portion of the glove.

Surgical gloves have heretofore been made by dipping a heated mold in a liquid plastisol until a thin plastic film has been formed. After curing this is stripped from the mold. One difficulty that was experienced arose because the cuff edge of the glove was frequently feathered, and could not be grasped easily for stripping.

The present invention avoids this problem by providing a cuff portion of increased thickness in a novel manner.

In the dip molding art it has been known that where an area of increased thickness is desired the corresponding area of the mold can be heated to a higher temperature so that more plastic will be deposited there. There are however a number of difficulties in selectively heating a certain area to an increased temperature. Special apparatus is frequently required in order to apply the additional heat, or else the molds may be specially constructed with internal heating elements. Frequently the dipping of the mold must be carried out slowly in order to avoid the entrapment of air. In the time thus required for the dipping operation there will be a tendency for the entire mold to come to a uniform temperature because of heat transfer from the hotter areas to the cooler areas, and the mold then loses its ability to continue the build up of areas of increased thickness.

This invention avoids these difficulties and provides an extremely simple process by which dip-moulded articles may be provided with a band of increased thickness. The process of this invention is based on the utilization of a mold formed of material having a certain combination of thermal characteristics by which a selectively hotter area may be provided by heating the entire mold to the higher temperature and then cooling all but the area corresponding to the band of increased thickness. The process is ideally suited to the manufacture of surgical gloves, which are formed on a hand-shaped mold by dipping with the fingers down and the open cuff area at the top.

I have found that a mold having the thermal characteristics of porcelain may be differentially heated in this manner while retaining sufficient heat to gel a vinyl plastisol and at the same time maintain a sufficient temperature differential that an increased amount of plastisol may be deposited on the uppermost cuff portion. It is accordingly postulated that a suitable mold should have a relatively high volumetric specific heat (expressed as calories per degree centigrade per cubic centimeter) combined with a relatively low thermal conductivity. (Calories transmitted per second through a plate one centimeter thick across an area of one square centimeter when the temperature difference is one degree centigrade.) The volumetric specific heat of porcelain is about .625 and its thermal conductivity is about .0025.

The process of this invention is illustrated schematically in the accompanying drawings in which.

Figure 1:
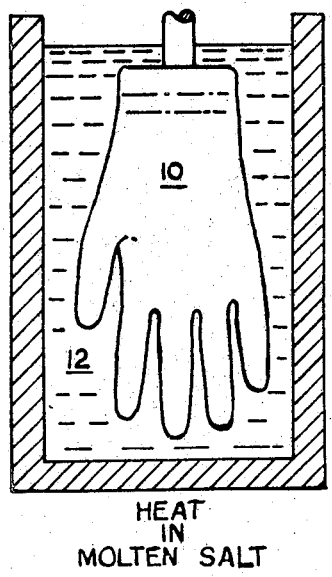
FIG. 1 illustrates the entire mold being heated in a molten salt bath.
Figure 2:
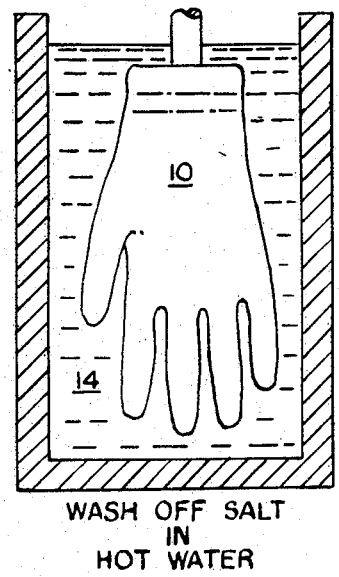
FIG. 2 illustrates the step of rinsing off the excess salt in water.
Figure 3:
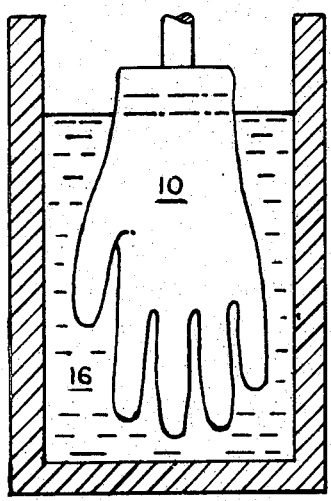
FIG. 3 illustrates the selective cooling of the main portion of the mold, up to the cuff.
Figure 4:
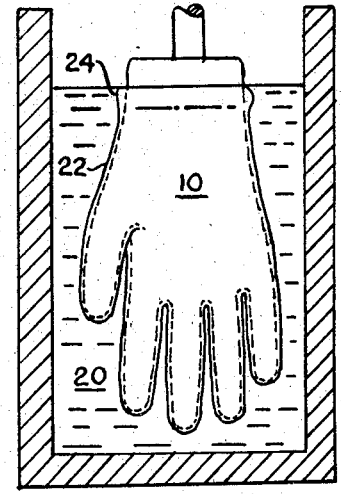
FIG. 4 illustrates the mold being dipped into the plastisol.

In carrying out the process according to its preferred embodiment, the mold 10 is first heated in a salt bath 12 maintained at between 350–400° F. for about 3 minutes, and is then rinsed in boiling water 14 to wash off residual salt. The mold, which is still hot, is next dipped in warm water 16 (50–70° F.) up to a point corresponding to the edge of the cuff for from ½ to 1 minute. During this step the lower portions of the mold are selectively cooled, leaving the cuff portion correspondingly hotter.

After its removal from the water dip, the mold is slowly dipped into the plastisol 20 such that between about 5 and 15 seconds are required to introduce the entire mold. After a dwell period of between about 5 and 15 seconds (depending on the thickness desired) the mold is slowly withdrawn over a period of from about 2 to 8 minutes.

At this stage the mold is covered with a film 22 of gelled plastisol, that at the cuff 24 being thicker than the remainder. The mold is finally heated in an oven at about 350° F. until the plastisol is cured. After this curing step the gloves may be easily stripped from the mold as the cuff portions are thick and strong and may be readily grasped.

Figure 5:
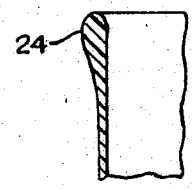
FIG. 5 is a fragmentary view partly in section illustrating the increased thickness of the cuff area.

As shown in FIG. 5, the cuff portion 24 is formed with a thick terminal edge and tapers gradually to merge smoothly with the hand part of the glove. This graduation is accounted for in part by the temperature gradient within the cuff portion, as thermal conduction will render the material at the hand edge of the cuff cooler than the material at the terminal edge.

Typically the hand part of the glove will be about .002–.004 inch thick with the cuff tapering out to about .020 inch in thickness.

The plastisol composition may be any of a number of commercially available vinyl plastisols, consisting essentially of a vinyl chloride polymer dispersed in a plastisizer, such as dioctyl phthalate. Upon heating to about 350° F. the polymer and plasticizer combine to form a plastisized somewhat elastomeric solid.

Although this invention has been described with specific reference to its preferred embodiment, it is contemplated that obvious modifications will occur to those skilled in the art and familar with the principles herein disclosed and that such can be made without departing from the scope of this invention.

In particular, other articles may be formed and the mold may be formed of other materials which have thermal characteristics comparable to porcelain, e.g., a volumetric specific heat greater than 0.45 calorie per ° C. per cc. and a thermal conductivity less than 0.01, preferably between 0.001 and 0.01.

Having thus disclosed my invention and described in detail preferred embodiments thereof, I claim and desire to secure by Letters Patent:

1. In the process of making a dip-molded thin plastic glove in which a heated mold form is immersed into a heat hardenable plastic forming liquid, the method of forming a band of increased thickness which comprises utilizing a mold having a high volume specific heat, of at least 0.45, and a low conductivity, between 0.001 and 0.01, heating all of said mold to a first elevated temperature, immersing said mold up to the lower edge of said band in a cooling medium, and then dipping said mold including said band into said heat hardenable plastic-forming liquid until a film of plastic is formed on the surface thereof whereby the portion adjacent to said band is of increased thickness, curing said plastic, and stripping the glove from the mold.

References Cited

UNITED STATES PATENTS

| | | | |
|---|---|---|---|
| 1,998,896 | 4/1935 | Kay | 264—327 X |
| 2,588,571 | 3/1952 | Porter | 264—327 X |
| 2,670,337 | 2/1954 | Toulmin | 264—327 X |
| 2,786,238 | 3/1957 | Shapero | 264—306 X |
| 3,256,564 | 6/1966 | Welshon | 264—327 X |

FOREIGN PATENTS 563,042    9/1958    Canada.

ROBERT F, WHITE, Primary Examiner

N. RUSHEFSKY, Assistant Examiner

U.S. Cl. X.R.

2—167; 264—306, 327